United States Patent [19]

Sutton, Jr.

[11] Patent Number: 4,906,731

[45] Date of Patent: Mar. 6, 1990

[54] POLYIMIDE MOLECULAR WEIGHT ENHANCEMENT BY SOLVENT EXTRACTION

[75] Inventor: Richard F. Sutton, Jr., Circleville, Ohio

[73] Assignee: E. I. Du Pont De Nemours and Company, Wilmington, Del.

[21] Appl. No.: 56,052

[22] Filed: Jun. 1, 1987

[51] Int. Cl.$^4$ ............................................. C08G 69/26
[52] U.S. Cl. .................................... 528/353; 528/125; 528/126; 528/128; 528/188; 528/229
[58] Field of Search ............... 528/353, 125, 126, 128, 528/188, 229

[56] References Cited

U.S. PATENT DOCUMENTS

| | | | |
|---|---|---|---|
| 3,961,009 | 6/1976 | Yoda et al. | 264/205 |
| 4,358,581 | 11/1982 | Sutton, Jr. | 528/353 |
| 4,470,944 | 9/1984 | Asakura et al. | 264/213 |

*Primary Examiner*—John Kight
*Assistant Examiner*—M. L. Moore
*Attorney, Agent, or Firm*—Paul R. Steyermark

[57] ABSTRACT

Extraction of polyamic acid-polyimide gel in bipolymerized polyimide manufacturing process with a solvent containing an extraction-enhancing agent, which is a pyridine, picoline, or quinoline, leads to a polyimide film having increased molecular weight. Polyimides are valuable materials used in fabricating articles which must withstand high temperatures, especially in aerospace applications, and in the manufacture of electronic circuit boards.

11 Claims, No Drawings

POLYIMIDE MOLECULAR WEIGHT ENHANCEMENT BY SOLVENT EXTRACTION

BACKGROUND OF THE INVENTION

This invention relates to a process for enhancing the molecular weight of polyimide resins by extraction of certain materials present in those resins.

Polyimides, as a class, are well known industrial resins, which have found increasing use in the manufacture of articles that must be able to withstand high temperatures without degradation, for example, in aerospace applications such as missile nose cones and in the manufacture of printed circuit boards for electronic equipment, especially for computers.

Polyimides are normally made from a tetracarboxylic acid dianhydride and a diamine by a process that requires two steps, namely, the formation of a polyamic acid and the subsequent cyclization of the polyamic acid to the polyimide. Cyclization can be obtained either by heating, in which case it is usually referred to as "thermal conversion" or by chemical means (which still is followed by some heating), in which case it is referred to as "chemical conversion".

An improved process for the manufacture of polyimides is described in my U.S. Pat. No. 4,358,581, which process first produces a prepolymer of polyamic acid, and this material is further mixed with a monomer polymerizable with the prepolymer in an amount which would yield high molecular weight polyamic acid and with a conversion system. The resulting solution is then converted into high molecular weight polyimide. The above U.S. Pat. No. 4,358,581 provides a very good and detailed explanation of that process and also discusses in its introductory part a number of U.S. patents generally pertinent to the art of polyimide manufacture.

U.S. Pat. No. 4,358,581 is hereby incorporated by reference into the present disclosure, and the process claimed in that patent will be generally referred to throughout this disclosure and claims as the "polyimide bipolymerization process".

It is generally realized that the presence in the polyamic acid precursor or in the final polyimide of various impurities, including, e.g., residual solvents, is undesirable because such impurities adversely affect the physical and mechanical properties of the resulting polyimides, including their molecular weight, tensile strength, and dielectric properties. Accordingly, extraction of impurities from either polyamic acids or polyimides has been proposed in the past. Representative patents dealing with this problem are U.S. Pat. No. 3,961,009 (to Yoda et al.) and U.S. Pat. No. 4,470,944 (to Asakura et al.), both assigned to Toray Industries, Inc.

While such heretofore known extractions have produced improved polyimides, the degree of improvement obtained by those earlier processes still is considered quite modest, and further improvement is very desirable.

SUMMARY OF THE INVENTION

According to the present invention, there is provided an improved process for making bipolymerized polyimide film, said process comprising the following steps:
(a) establishing a polymerization solution of
   (i) polyamic acid prepolymer,
   (ii) a finishing component polymerizable with the prepolymer to yield polyamic acid polymer, and
   (iii) a conversion system to convert polyamic acid prepolymer to polyimide polymer, the temperature of the solution being maintained below the temperature at which the prepolymer and the finishing component react in the presence of the conversion system;
(b) warming the solution to cause polymerization of the prepolymer and the finishing component, whereby, as the prepolymer is polymerized with the finishing component, it is initially converted by the conversion system into a polyamic acid-polyimide gel;
(c) contacting the polyamic acid-polyimide gel with an extraction medium comprising a solution of at least one extraction-enhancing agent which is a member of the class of heterocyclic amines consisting of pyridines, picolines, and quinolines in a solvent which does not react to a significant degree with the polyamic acid-polyimide gel under the experimental conditions; and
(d) drying the gel at a sufficient temperature to substantially remove the liquid components of the gel, complete polyamic acid cyclization to polyimide, and cause chain extension to occur.

DETAILED DESCRIPTION OF THE INVENTION

Polyimides that can be made by the process of the present invention can be based on tetracarboxylic acid dianhydrides and diamines known to those skilled in the art and either commercially available or capable of being manufactured according to known processes. Typical dianhydrides include, for example:
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
3,3',4,4'-benzophenone tetracarboxylic dianhydride;
bis(3,4-dicarboxyphenyl) sulfone dianhydride;
3,4,9,10-perylene tetracarboxylic dianhydride;
bis(3,4-dicarboxyphenyl) propane dianhydride;
1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride; and the like.

Typical diamines include, for example:
4,4'-diaminodiphenylpropane;
4,4'-diaminodiphenylmethane; benzidine,
3,3'-dichlorobenzidine;
4,4'-diaminodiphenyl sulfide;
3,3'-diaminodiphenyl sulfone;
4,4'-diaminodiphenyl sulfone;
4,4'-oxydianiline;
1,5-diaminonaphthalene;
4,4'-diaminodiphenyl diethylsilane;
4,4'-diaminodiphenyl diphenylsilane;
4,4'-diaminodiphenyl ethylphosphine oxide;
4,4'-diaminodiphenyl-N-methylamine;
4,4'-diaminodiphenyl N-phenylamine; and the like.

Pyromellitic dianhydride and 3,3',4,4'-benzophenonetetracarboxylic dianhydride are the preferred dianhydrides: while 4,4'-oxydianiline is the preferred diamine.

For the purpose of the present disclosure and the claims, the terms "prepolymer", "finishing component", and "conversion system", have the same meaning as in the above-cited U.S. Pat. No. 4,358,581.

Representative solvents in which the extraction-enhancing agent can be dissolved include: (1) water; (2) organic solvents such as, e.g., at least one of N,N-dimethylacetamide, dimethylformamide, dimethyl sulfoxide, N-methyl-2-pyrrolidone, acetone, diethylformamide, diethylacetamide, and dimethylmethoxyacetamide, either neat or in combination with water or a mutually soluble organic solvent; (3) alcohols such as methyl, ethyl, propyl, isopropyl, various isomeric butyl alcohols, etc., either alone or in combination with water or a mutually soluble organic solvent, e.g., acetone, methyl ethyl ketone, dioxan, tetrahydrofuran, etc.; and (4) aromatic or aliphatic hydrocarbons, such as, e.g., benzene, toluene, xylene, pentane, hexane, octane, decane, etc., either alone or combined with mutually soluble organic solvents such as, e.g., alcohols, diols and polyols, ethers, and ketones.

All such solvents should not react to a significant degree with polyamic acid under the process conditions within the time the solvent and polyamic acid are in contact with each other, and they should not be acidic. Organic acids, such as, e.g., glacial acetic acid, formic acid, or propionic acid, should be avoided.

Polyimides to which extraction according to this invention is applied, are prepared according to the general process taught by U.S. Pat. No. 4,358,581. Those polyimides are made by combining at least one organic diamine

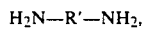

H$_2$N—R'—NH$_2$, wherein R' is a divalent radical containing at least two carbon atoms, and the two amino groups are each attached to separate carbon atoms of said divalent radical; with at least one tetracarboxylic acid dianhydride having the structural formula:

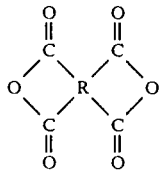

wherein R is a tetravalent radical containing at least two carbon atoms, and no more than two carbonyl groups of said dianhydride are attached to any one carbon atom of said tetravalent radical.

A number of diamines and tetracarboxylic acid dianhydrides can be used for the preparation of polyimides, as is generally well known. Many such diamines and acid dianhydrides are disclosed, e.g., in U.S. Pat. No. 3,179,630 (to Endrey), which is herein incorporated by reference. Typical diamines suitable for this purpose include, for example:
m-phenylenediamine
p-phenylenediamine
benzidine
4,4'-diaminodiphenyl-1,3-propane;
hexamethylenediamine;
4,4'-dimethylheptamethylene diamine; and
4,4'-oxydianiline.

Suitable tetracarboxylic acid dianhydrides include, for example:
pyromellitic dianhydride;
benzophenonetetracarboxylic dianhydride;
naphthalenetetracarboxylic dianhydride; and
diphenyltetracarboxylic dianhydride As explained in U.S. Pat. No. 4,358,581, the finishing component is a solution including either a diamine for use with dianhydride-terminated prepolymer or a tetracarboxylic acid dianhydride for use with diamine-terminated prepolymer.

There is no requirement that the dianhydride or the diamine of the finishing solution must be the same as the dianhydride or the diamine of the prepolymer. The reactive component of the finishing solution can be the same as the corresponding component in the prepolymer, or it can be different; and the finishing solution and the prepolymer can contain combinations or mixtures of reactive components.

The conversion system comprises materials capable of converting polyamic acid to polyimide. Lower fatty acid anhydrides and tertiary amines can be used as the conversion system, optionally, in the presence of other solvents. Suitable lower fatty acid anhydrides include, i.a.: acetic anhydride, propionic anhydride, aliphatic ketenes, acetic formic anhydrides, n- and iso-butyric anhydride, and acetic benzoic anhydride, and mixtures of those anhydrides. Acetic anhydride and ketene are preferred. Ketenes are regarded as anhydrides of carboxylic acids, derived from drastic dehydration of the carboxylic acids.

Suitable tertiary amines include, i.a.: alpha-, beta-, and gamma-picoline, pyridine, 3,4- and 3,5-lutidine, quinoline, isoquinoline, triphenylamine, tridecylamine, trioctylamine, N,N-dimethylaniline, N,N-dimethylbenzylamine, triethylamine, triethylenediamine, tributylamine, and mixtures of those amines.

While the presence of a lower fatty acid anhydride is essential to the conversion system, presence of a tertiary amine is not. A tertiary amine in the conversion system is believed to accelerate the conversion reaction and, if such effect is not desired or required, the tertiary amine can be omitted. When a combination of the anhydrides and the amines is used, the anhydrides and amines may be used in amounts from about equimolar (e.g., for the acetic anhydride/beta-picoline pair) to a large excess of the anhydride, e.g., 10 moles of acetic anhydride for 1 mole of triethylamine, depending on the catalytic activity of the tertiary amine.

The diamine and tetracarboxylic acid dianhydride components of the prepolymer are used in an amount which will provide a polymerization solution of relatively low viscosity, in the range of about 5 to 30,000 poises, and preferably about 40 to 4000 poises, at 25 C. The polymerization solution can contain about 5 to 60 weight percent of prepolymer, and 15 to 40 is preferred. The lower concentration limits are generally a matter of convenience and reaction efficiency. The higher concentration limits are determined by viscosity, which must permit the solutions to be readily handled. The process of this invention is particularly suitable for making polyimide from a high concentration prepolymer solution and, for such high concentration manufacture, prepolymer can be used at levels of 15 to 40 weight percent, or perhaps slightly higher. At concentrations appreciably below about 15 weight percent, the benefit of high concentration manufacture is not fully realized; and above about 40 weight percent the viscosity of the prepolymer solution is so high that handling and shaping the solution becomes difficult. The present invention is usually practiced with prepolymer in solution at a concentration of about 20 to 35 weight percent because the combination of overall solvent in the system and the viscosity characteristics of solutions of the normally used component materials is most favorable in that concentration range.

The solvent used in the practice of the bipolymerization process should be one that does not react to a significant degree with any other components of the system and which does not interfere with any of the reactions leading to the polyimide product. The solvent should dissolve the diamine component, the dianhydride component, and the components of the conversion system. It is also preferred that the solvent dissolve the polyamic acid at least to some degree. Suitable solvents include, i.a.: N,N-dimethylformamide and N,N-dimethylacetamide, which are preferred because they are easily removed from the polymerization solution by evaporation, diffusion, or displacement; N,N-diethylformamide; N,N-diethylacetamide; N,N-dimethylmethoxyacetamide; dimethyl sulfoxide; and mixtures of those solvents.

To prepare a polyimide by the "bipolymerization" process, a polymerization solution is prepared and maintained below the polyamidization temperature —that is, the temperature above which the prepolymer and the finishing component would rapidly polymerize. The polymerization solution is then shaped, such as by being formed into a film or fiber warmed concentration in the solvent system chosen for the polymerization. Next, the prepolymer is cooled below the polyamidization temperature—below about 25° to 30° C. and above the solution freezing point; for most polymerizing systems, a temperature of about 5° C. is used. The finishing component and the conversion system are mixed with the prepolymer, and the resulting polymerization solution is formed into any desired final shape. It should be noted here that the concentrated polymerization solution will form a sufficient amount of gel to give it some integrity shortly after it is cooled. Finally, the temperature of the polymerization solution is increased to cause solvent evaporation and to complete gelling, amidization, and imidization. Partial imidization has been found to proceed at an acceptable rate above about 25° C. and preferably between 40° and 160° C. The warming step to convert polyamide acid to polyimide is normally followed by a heat treating step which includes exposure of the polyimide to temperatures of about 200° to 400° C. for a period of up to about 30 minutes or perhaps slightly longer.

The extraction step according to the present invention is carried out following the initial imidization step (above about 25° C.) but before the heat treating step (at 200°–400° C.). Suitable heterocyclic amines used as extraction-enhancing agents include, i.a., alpha-, beta-, and gamma-picoline, pyridine, 3,4- and 3,5-lutidine, quinoline, isoquinoline, and mixtures of these amines. Extraction is conducted between the freezing point of the solvent and its boiling point, but always below the temperature at which rapid imidization of polyamic acid would take place, normally at a temperature of about 15°–80° C. The extraction time depends to a large extent on the extraction temperature and can be shorter for higher temperatures. It also depends on the amount of solvent to be extracted from the polyamic acid-polyimide gel as well as on the thickness of the polyamic acid-polyimide material to be extracted.

The extraction process can be conducted either continuously, moving the gel material through a tank or a series of tanks containing the extraction solution, or batchwise, introducing the gel into an extraction tank and removing it from the tank after a predetermined residence time. All such techniques and variants thereof are generally known to those skilled in the art and can be readily employed or adapted to particular circumstances.

The invention is now illustrated by the following examples of certain preferred embodiments thereof, where all parts, proportions, and percentages are by weight, unless otherwise indicated.

The following general operating technique was used:

Polyimide was prepared from 4,4'-oxydianiline (ODA) and pyromellitic dianhydride in mole ratios such that a slight excess of the diamine was present. ODA was dissolved in N,N-dimethylacetamide (DMAC). Then, the dianhydride was added either as a solid or in a DMAC solution in such proportions that the desired processable Brookfield viscosity of the resulting solution was obtained, and the solution was chilled to about 5° C. or less. The finishing component (which was a solution of pyromellitic dianhydride) was then added in a ratio to give approximately a 1:1 ratio of dianhydride to diamine, and immediately followed by the conversion system of acetic anhydride and a tertiary amine such as beta-picoline, each of them at a concentration of 2.6 moles per mole of polymer. The resulting solution was coated out on a glass plate and heated at a suitable conversion temperature to make a gel film. That film was usually placed for 5 minutes in an extraction solution of the desired composition at room temperature according to the present invention.

EXAMPLE 1

Gel film was prepared as above, at a conversion temperature of 60° C., and placed in extraction solutions containing either 1-molar concentrations of various amines listed in Tables I and II, below, or in solvents alone.

The film extracted as described above was dried at 260° C. for 1 minute and 405° C. for 30 seconds in a sand bath. The inherent viscosities of the film extracted according to the present invention were then compared with those of the film extracted with an aliphatic tertiary amine or with the solvent alone. All the inherent viscosities in this and in the following examples were measured in a capillary type viscometer, in concentrated sulfuric acid, at a polymer concentration of 0.5 g/dl, and at a temperature of 30° C.

Table I gives inherent viscosity data for the film extracted with various amines in DMAC or with DMAC alone, while Table II gives such data for the film extracted with amines in xylene, or with xylene alone.

TABLE I

| Base in Extraction System | Film Inherent Viscosity dl/g | Calculated Degree of Polymerization |
|---|---|---|
| Pyridine | 1.32 | 63.6 |
| Beta-picoline | 1.23 | 56.1 |
| Isoquinoline | 1.22 | 55.3 |
| Quinoline | 1.08 | 44.5 |
| DMAC alone | 1.02 | 40.2 |
| Tripropylamine | 0.41* | — |
| Triethylamine | 0.88 | 30.8 |
| Diethylamine | 0.30* | — |

*Samples were very brittle and broke. These were obviously low molecular weight materials.

TABLE II

| Base in Extraction System | Film Inherent Viscosity dl/g | Calculated Degree of Polymerization |
|---|---|---|
| Pyridine | 1.43 | 73.4 |
| Beta-picoline | 1.42 | 72.5 |
| Xylene alone | 1.27 | 59.4 |
| Triethylamine | 1.09 | 45.2 |
| Diethylamine | 0.19* | — |
| Dipropylamine | 0.40* | — |

*Samples were brittle and broke readily. They were obviously low molecular weight materials.

The above data show that aromatic amines of the type recited in the Summary of the Invention significantly improve the extraction, as compared with aliphatic amines or with solvent alone. The extracted polyimide film has higher inherent viscosity and thus also higher molecular weight.

EXAMPLE 2

Gel film prepared in the same manner as in Example 1 was extracted in methanol at room temperature for 5 minutes, and then was dried for 30 minutes in an air oven at 300° C., followed by 40 seconds in a sandbath at 405° C. The inherent viscosity of the film was 1.38 dl/g. A second piece of gel film was extracted in a solution of 0.5-molar beta-picoline in methanol for 5 minutes at room temperature and was dried in the same manner as the first sample. The inherent viscosity was 1.54 dl/g, which was an improvement over methanol alone.

EXAMPLE 3

Gel film was prepared in the same manner as before and extracted in n-butanol for 5 minutes at room temperature. It was then dried according to the same schedule as in Example 2. The inherent viscosity of the dry film was 1.18 dl/g. When the same type of gel film was extracted in a 0.5-molar solution of beta-picoline in n-butanol and dried in the same manner, the inherent viscosity of the dry film improved to 1.39 dl/g.

EXAMPLE 4

Gel film of the same type as in the preceding examples was extracted in isooctane and dried under the same conditions as in the preceding examples. Its inherent viscosity was 1.39 dl/g. When the extractant was replaced with a 0.5-molar solution of pyridine in isooctane, the inherent viscosity of the dry film improved to 1.61 dl/g.

EXAMPLE 5

Gel film was prepared from the same starting materials as before, except that the conversion temperature was 65° C. This film was extracted at room temperature for 5 minutes in an aqueous solution containing 34% of DMAC. The extracted film was dried for 30 minutes in an air oven at 240° C. and then for 40 seconds at 405° C. in a sandbath. The inherent viscosity of the dry film was 1.53 dl/g. A second sample of the same type of gel film was extracted in a 1-molar solution of pyridine in water containing 34% of DMAC. The extracted sample was dried in the same manner as the first. Its inherent viscosity was 1.69 dl/g. A third piece of gel was extracted in the same manner in a 1- molar solution of beta-picoline in water containing 34% of DMAC and was dried according to the same procedure. The inherent viscosity of this film was 1.76 dl/g.

EXAMPLE 6

Gel film was prepared as in Example 1 but using a conversion system of 2.7 moles of acetic anhydride and 2.6 moles of beta-picoline per mole of polymer solids. The gel was formed at 65° C., as in Example 5. The gel film was extracted in distilled water for 5 minutes at room temperature and dried in an air oven at 240° c. for 5 minutes, followed by 40 seconds in a sandbath at 404° C. The film had an inherent viscosity of 1.93 dl/g. A second gel sample prepared in the same manner was extracted in a 1-molar solution of beta-picoline in distilled water for 5 minutes at room temperature and was dried in the same manner as before. The inherent viscosity of this second sample was 2.18 dl/g.

I claim:

1. In a process for making bipolymerized polyimide film, said process comprising the following steps:
   (a) establishing a polymerization solution of
      (i) polyamic acid prepolymer,
      (ii) a finishing component polymerizable with the prepolymer to yield polyamic acid polymer, and
      (iii) a conversion system to convert polyamic acid prepolymer to polyimide polymer, the temperature of the solution being maintained below the temperature at which the prepolymer and the finishing component react;
   (b) warming the solution to cause polymerization of the prepolymer and the finishing component, whereby, as the prepolymer is polymerized with the finishing component, it is initially converted by the conversion system into a polyamic acid-polyimide gel; and
   (c) drying the gel at a sufficient temperature to substantially remove the liquid components of the gel, complete polyamic acid cyclization to polyimide, and cause chain extension to occur;
   the improvement of contacting the polyamic acid-polyimide gel prior to step (c) with an extraction medium comprising a solution of at least one extraction-enhancing agent which is a member of the class of heterocyclic amines consisting of pyridines, picolines, and quinolines in a solvent which does not react to a significant degree with the polyamic acid-polyimide gel under the experimental conditions, and thereby causing an increase of the molecular weight of the so produced polyimide film.

2. The process of claim 1 wherein the extraction-enhancing agent is beta-picoline.

3. The process of claim 1 wherein the solvent in which the extraction-enhancing agent is dissolved is water.

4. The process of claim 1 wherein the solvent in which the extraction-enhancing agent is dissolved is an aqueous solution of an organic solvent.

5. The process of claim 4 wherein the solvent in which the extraction-enhancing agent is dissolved is an aqueous solution of N,N-dimethylacetamide.

6. The process of claim 1 wherein the solvent in which the extraction-enhancing agent is dissolved is a hydrocarbon.

7. The process of claim 6 wherein the solvent is xylene.

8. The process of claim 6 wherein the solvent is isooctane.

9. The process of claim 1 wherein the solvent in which the extraction-enhancing agent is dissolved is an alcohol.

10. The process of claim 9 wherein the alcohol is n-butanol.

11. The process of claim 9 wherein the alcohol is methanol.

* * * * *